United States Patent
Wu (10) Patent No.: US 11,637,606 B2
(45) Date of Patent: Apr. 25, 2023

(54) METHOD AND DEVICE FOR AVOIDING FALSE ALARMS OF CHANNEL STATE INFORMATION DUE TO ACTIVATION OF CLOSED LOOP POWER CONTROL FUNCTION

(71) Applicant: Wistron NeWeb Corp., Hsinchu (TW)

(72) Inventor: Chia-Hsin Wu, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 8 days.

(21) Appl. No.: 17/365,074

(22) Filed: Jul. 1, 2021

(65) Prior Publication Data
US 2022/0077910 A1 Mar. 10, 2022

(30) Foreign Application Priority Data
Sep. 7, 2020 (TW) ................. 109130552

(51) Int. Cl.
*H04B 7/06* (2006.01)
*H04W 52/08* (2009.01)
*H04W 84/12* (2009.01)

(52) U.S. Cl.
CPC .......... *H04B 7/0626* (2013.01); *H04W 52/08* (2013.01); *H04W 84/12* (2013.01)

(58) Field of Classification Search
CPC ..... H04B 7/0626; H04B 17/23; H04W 52/08; H04W 84/12
See application file for complete search history.

(56) References Cited

U.S. PATENT DOCUMENTS

| | | | |
|---|---|---|---|
| 2002/0151322 A1* | 10/2002 | Agin | H04W 52/04 455/69 |
| 2014/0293916 A1 | 10/2014 | Sohn et al. | |
| 2015/0319700 A1 | 11/2015 | Oteri et al. | |
| 2016/0021568 A1* | 1/2016 | Yu | H04L 27/2603 370/329 |
| 2017/0070961 A1 | 3/2017 | Bharadwaj et al. | |
| 2017/0135131 A1* | 5/2017 | Hart | H04W 74/08 |
| 2019/0253184 A1* | 8/2019 | Xing | H04W 72/0446 |
| 2019/0274054 A1* | 9/2019 | Salem | H04L 12/189 |

* cited by examiner

*Primary Examiner* — Christine Ng
(74) *Attorney, Agent, or Firm* — McClure, Qualey & Rodack, LLP (57) ABSTRACT

A method for avoiding false alarms of Channel State Information (CSI) due to the activation of a Closed Loop Power Control (CLPC) function is provided. The method is executed by a transmitting device and includes: determining whether the CLPC function of the transmitting device is enabled; adding at least one CLPC tag to a physical layer convergence procedure (PLCP) protocol data unit (PPDU) when the CLPC function is enabled; and transmitting the PPDU.

10 Claims, 10 Drawing Sheets

| Field | Description |
|---|---|
| L-STF | Legacy (non-HT) Short Training field |
| L-LTF | Legacy (non-HT) Training field |
| L-SIG | Legacy (non-HT) Signal field |
| RL-SIG | Repeated Legacy (non-HT) Signal field |
| HE-SIG-A | HE Signal A field |
| HE-SIG-B | HE Signal B field |
| HE-STF | HE short Training field |
| HE-LTF | HE Long Training field |
| Data | The Data field carrying the PSDU(s) |
| PE | Packet Extension field |

METHOD AND DEVICE FOR AVOIDING FALSE ALARMS OF CHANNEL STATE INFORMATION DUE TO ACTIVATION OF CLOSED LOOP POWER CONTROL FUNCTION

CROSS REFERENCE TO RELATED APPLICATIONS

This application claims priority from Taiwan Patent Application No. 109130552, filed on Sep. 7, 2020, the disclosure of which is incorporated herein by reference in its entirety.

BACKGROUND

Technical Field

The present disclosure generally relates to a method and device for avoiding false alarms of Channel State Information (CSI) due to the activation of a Closed Loop Power Control (CLPC) function. More specifically, aspects of the present disclosure relate to a method and device for avoiding false alarms of CSI based on Wi-Fi sensing due to activation of CLPC function.

Description of the Related Art

In recent years, rapid developments of wireless techniques have stimulated research studying the relationship between wireless signals and human activity. In particular, the recently exposed physical layer Channel State Information (CSI) on commercial Wi-Fi devices reveals multipath channel features at the granularity of orthogonal frequency-division multiplexing (OFDM) subcarriers, which is much more fine-grained than the received signal strength (RSS) of a traditional media access control (MAC) layer. Significant progress has been made in motion-detection applications.

The movement of humans and objects changes the multipath characteristics of the wireless channel, and hence the estimated channel will have a different amplitude and phase. In other words, CSI captures the wireless characteristics of the nearby environment. These characteristics, assisted by mathematical modeling or machine-learning algorithms, can be used for different sensing applications. This is the rationale for why CSI amplitude and phase can be used for Wi-Fi sensing.

Figure 1A:
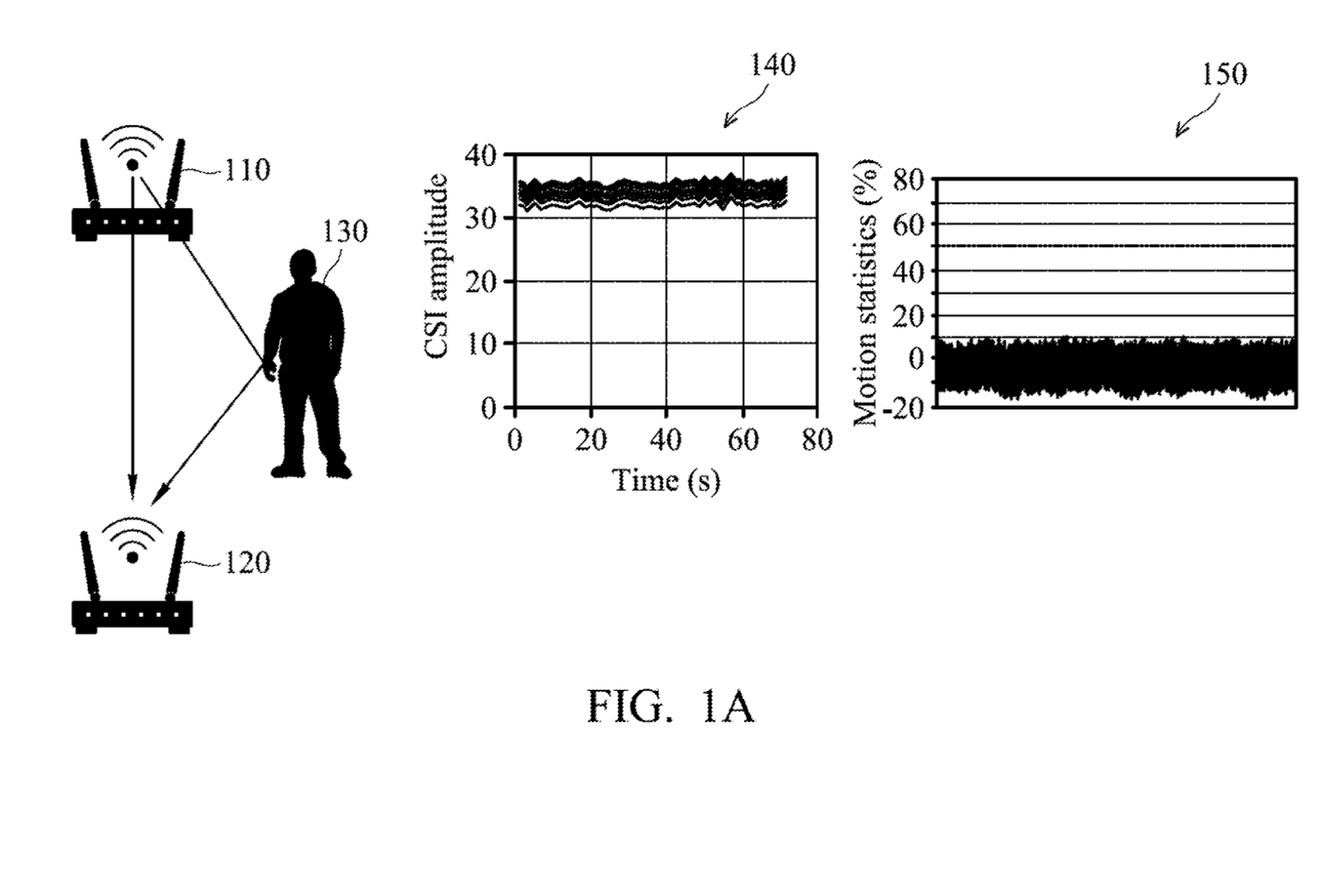
FIG. 1A is a schematic diagram showing the detection of no movement of objects in an area through a sensing system based on Wi-Fi.

In the prior art, a sensing system based on Wi-Fi can be used to detect the movement of an object. FIG. 1A is a schematic diagram showing the detection of no movement of objects in an area through a sensing system based on Wi-Fi. As shown in FIG. 1A, the receiving device 120 having at least two receiving antennas receives the signal transmitted by the transmitting device 110 and the reflected signal that reflects the signal transmitted by the transmitting device 110 through the object 130. The receiving device 120 may obtain the CSI between the transmitting antennas of the transmitting device 110 and the receiving antennas of the receiving device 120 according to the reflected signal. As shown in the relationship diagram 140 between CSI amplitude and time, when the object 130 is not moving in an area, the CSI amplitude is flat. The relationship diagram 140 may be converted into a motion statistics diagram 150 through mathematical modeling or machine-learning algorithms. In the motion statistics diagram 150, when there is no object 130 moving in this area, the action statistics is less than 15%.

Figure 1B:
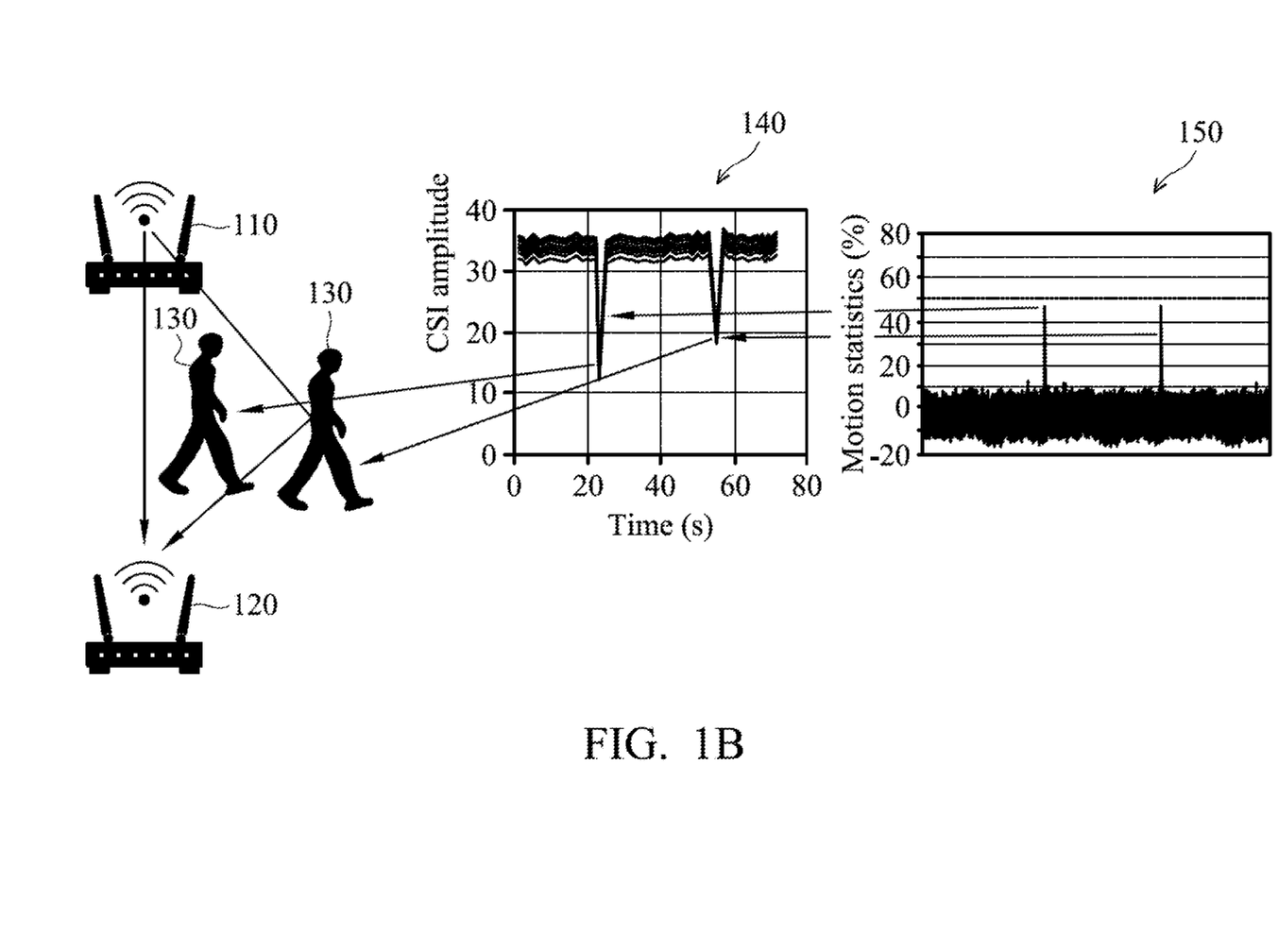
FIG. 1B is a schematic diagram showing the detection of movement of an object in an area through a sensing system based on Wi-Fi.

FIG. 1B is a schematic diagram showing the detection of movement of an object in an area through a sensing system based on Wi-Fi. When the object 130 moves in the area, in the relationship diagram 140 between CSI amplitude and time, the CSI amplitude may show decreases in response to the movement of the object. In the motion statistics diagram 150, the peaks of motion statistics corresponding to the movement of the object are higher than 30%.

Figure 1C:
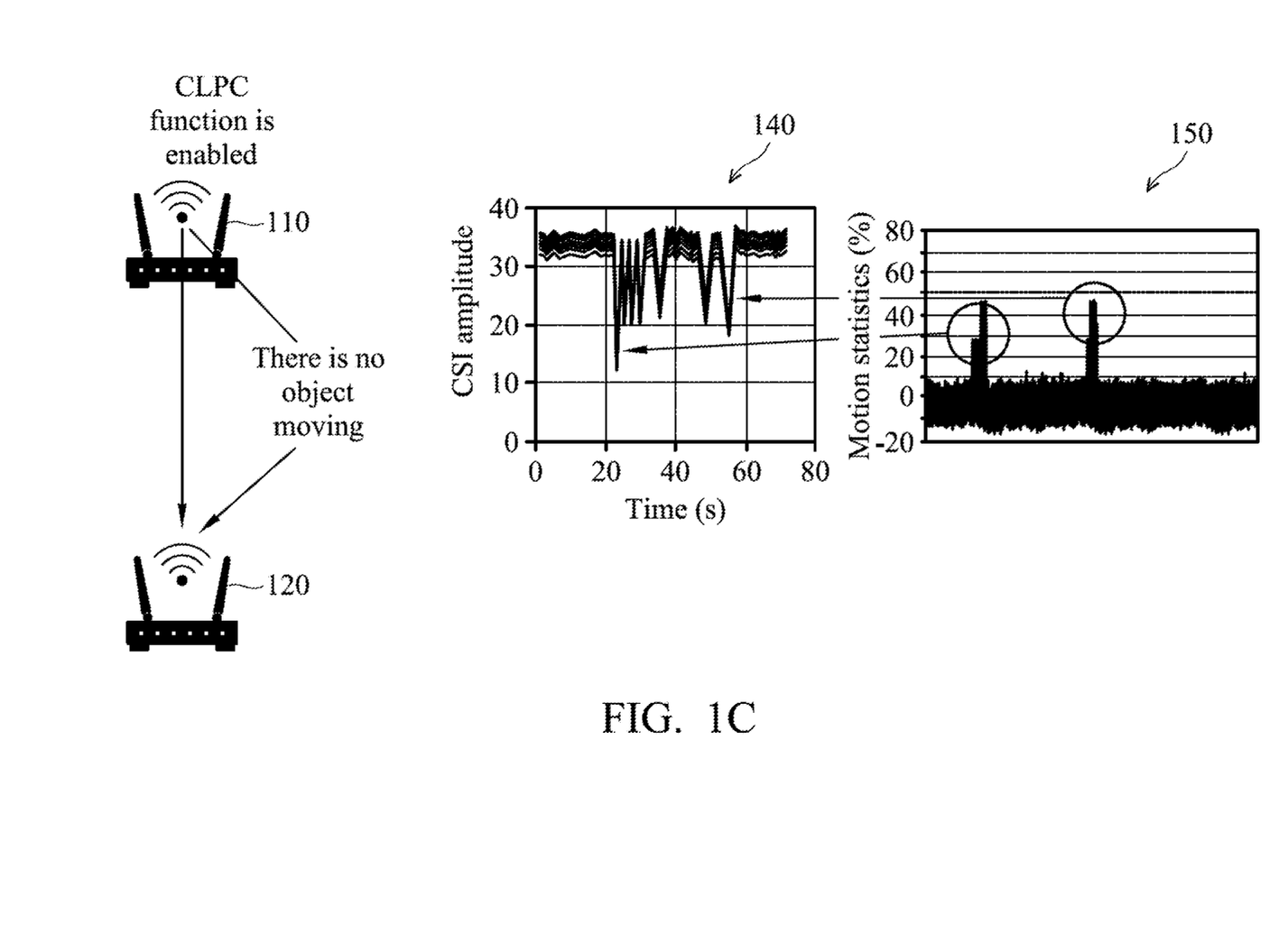
FIG. 1C is a schematic diagram showing the disturbance of the CSI amplitude caused by the activation of the CLPC function in the transmission device.

However, when the CLPC function is enabled on the transmitting device 110, even though the object does not move in the area, the CSI amplitude between the transmitting antennas of the transmitting device 110 and the receiving antennas of the receiving device 120 will still be disturbed. As shown in FIG. 1C, in the relationship diagram 140 between CSI amplitude and time, even though there is no object moving in the area, the CSI amplitude will decrease. In the motion statistics diagram 150, the spikes of some motion statistics are higher than 25%. In this case, the activation of the CLPC function will cause false alarms in motion detection. Therefore, there is a need for a method and device for avoiding false alarms of Channel State Information (CSI) due to the activation of a Closed Loop Power Control (CLPC) function to solve this problem.

SUMMARY

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

Therefore, the main purpose of the present disclosure is to provide a method and device for avoiding false alarms of CSI due to activation of the CLPC function to overcome the above disadvantages.

In an exemplary embodiment, a method for avoiding false alarms of Channel State Information (CSI) due to the activation of a Closed Loop Power Control (CLPC) function, wherein the method is performed by a transmitting device and comprises: determining whether the CLPC function of the transmitting device is enabled; adding at least one CLPC tag to a physical layer convergence procedure (PLCP) protocol data unit (PPDU) when the CLPC function is enabled; and transmitting the PPDU.

In an exemplary embodiment, a method for avoiding false alarms of Channel State Information (CSI) due to the activation of a Closed Loop Power Control (CLPC) function, wherein the method is performed by a receiving device and comprises: receiving a physical layer convergence procedure (PLCP) protocol data unit (PPDU) transmitted from a transmitting device; determining whether the PPDU comprises at least one CLPC tag; and discarding the PPDU when the PPDU comprises the CLPC tag.

In an exemplary embodiment, a device for avoiding false alarms of Channel State Information (CSI) due to the activation of a Closed Loop Power Control (CLPC) function comprises: one or more processors; and one or more computer storage media for storing one or more computer-readable instructions, wherein the processor is configured to drive the computer storage media to execute the following tasks: determining whether the CLPC function of the device is enabled; adding at least one CLPC tag to a physical layer convergence procedure (PLCP) protocol data unit (PPDU) when the CLPC function is enabled; and transmitting the PPDU.

In an exemplary embodiment, a device for avoiding false alarms of Channel State Information (CSI) due to the activation of a Closed Loop Power Control (CLPC) function comprises: one or more processors; and one or more computer storage media for storing one or more computer-readable instructions, wherein the processor is configured to drive the computer storage media to execute the following tasks: receiving a physical layer convergence procedure (PLCP) protocol data unit (PPDU) transmitted from a transmitting device; determining whether the PPDU comprises at least one CLPC tag; and discarding the PPDU when the PPDU comprises the CLPC tag.

BRIEF DESCRIPTION OF DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to their size in actual implementation in order to clearly illustrate the concept of the present disclosure.

DETAILED DESCRIPTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using number of the aspects set forth herein. In addition, the scope of the disclosure is intended to cover such an apparatus or method which is practiced using another structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

Figure 2:
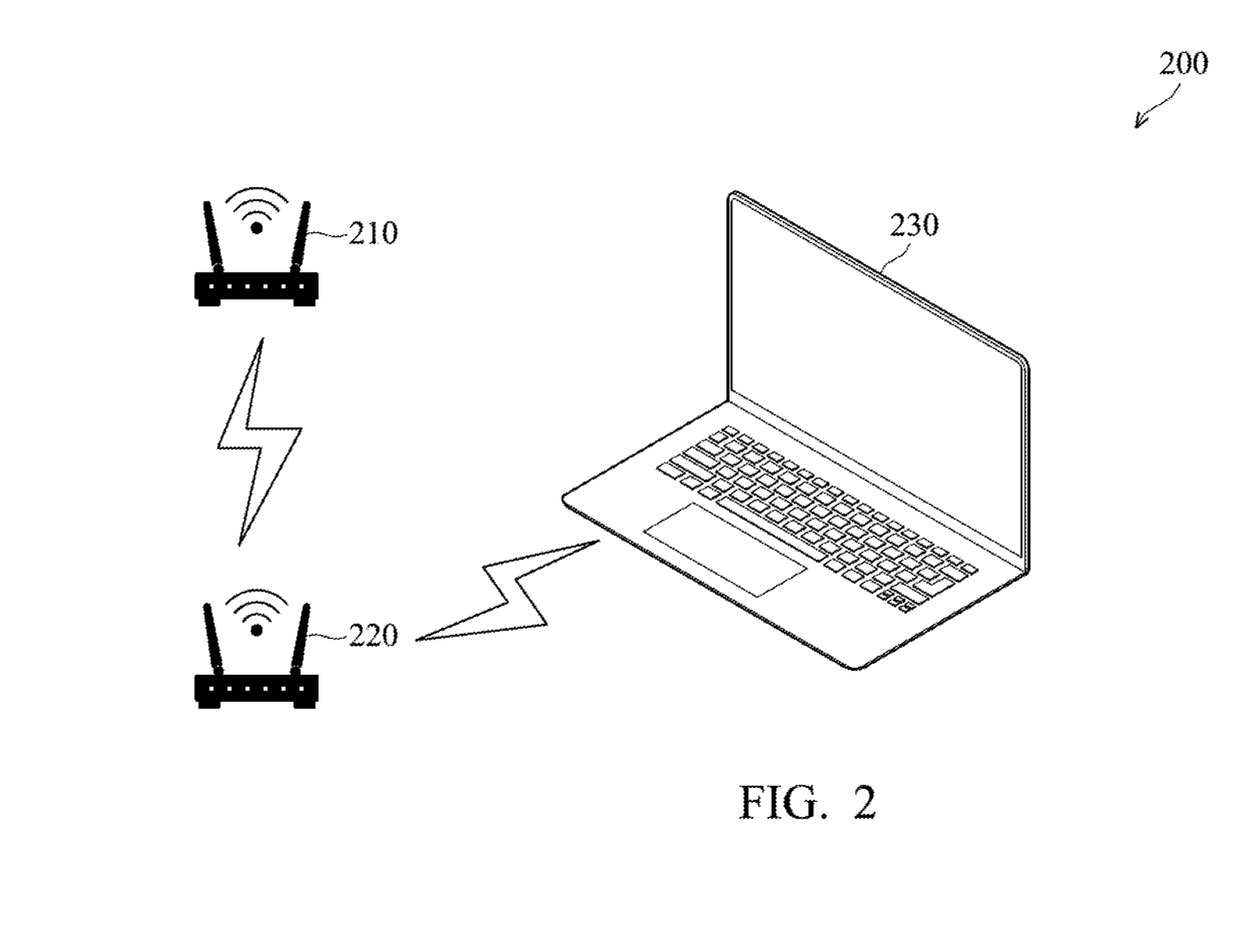
FIG. 2 is a schematic diagram illustrating a system for avoiding false alarms of Channel State Information (CSI) due to the activation of a Closed Loop Power Control (CLPC) function according to an embodiment of the present disclosure.

FIG. 2 is a schematic diagram illustrating a system 200 for avoiding false alarms of Channel State Information (CSI) due to the activation of a Closed Loop Power Control (CLPC) function according to an embodiment of the present disclosure. The system 200 comprises a transmitting device 210, a receiving device 220, and a computing device 230.

The transmitting device 210 has a plurality of transmitting antennas, wherein each of the transmitting antennas can transmit a measurement signal to an object in an area or directly transmit a measurement signal to the receiving device 220. The receiving device 220 has a plurality of receiving antennas, wherein each of the receiving antennas receives reflected signals reflected through the object or directly receives the measurement signal transmitted by the transmitting device 210. The transmitting device 210 and/or the receiving device 220 can be fixed or mobile and include various components that communicate with the computing device 230 and transmit and receive data and/or various control information to and from the computing device 230. The transmitting device 210 and the receiving device 220 can be a terminal device, a mobile station (MS), a mobile terminal (MT), a user terminal (UT), a subscriber station (SS), a wireless device, an access point (AP) or a processing server (PS). In an embodiment, the transmitting device 210 and the receiving device 220 may transmit and/or receive signals using a wireless communication technology such as a wireless local area network (WLAN), Bluetooth, ZigBee, Worldwide Interoperability for Microwave Access (WiMAX), Third Generation Of Wireless Mobile Telecommunications Technology (3G), Fourth Generation Of Cellular Network Technology (4G), Long Term Evolution (LTE) or LTE-Advanced. In one embodiment, the transmitting device 210 and the receiving device 220 support IEEE 802.11n/ac/ax.

The computing device 230 can transmit data to or receive data from the receiving device 220 over a wired network or wireless communication, and includes a processor and a memory that may store the program. The computing device 230 receives the reflected signals or measurement signals transmitted by the receiving device 220, obtains a channel state information (CSI) between the transmitting antennas of the transmitting device 210 and the receiving antennas of the receiving device 220 based on the reflected signals or measurement signals, and determines whether there is an object moving in an area according to the CSI.

The types of computing device 230 range from small handheld devices, such as mobile telephones and handheld computers, to large mainframe systems, such as mainframe computers. Examples of handheld computers include personal digital assistants (PDAs) and notebooks. In another embodiment, the computing device 230 may be used with components, systems, sub-systems, and/or devices other than those that are depicted herein. For example, the computing device 230 can be integrated with the receiving device 220 as a device.

It should be understood that the computing device 230 shown in FIG. 2 is an example of one suitable system 200 architecture for avoiding false alarms of CSI due to activation of the CLPC function. Each of the components shown in FIG. 2 may be implemented through any type of computing device, such as the computing device 800 described with reference to FIG. 8, for example.

Figure 3:
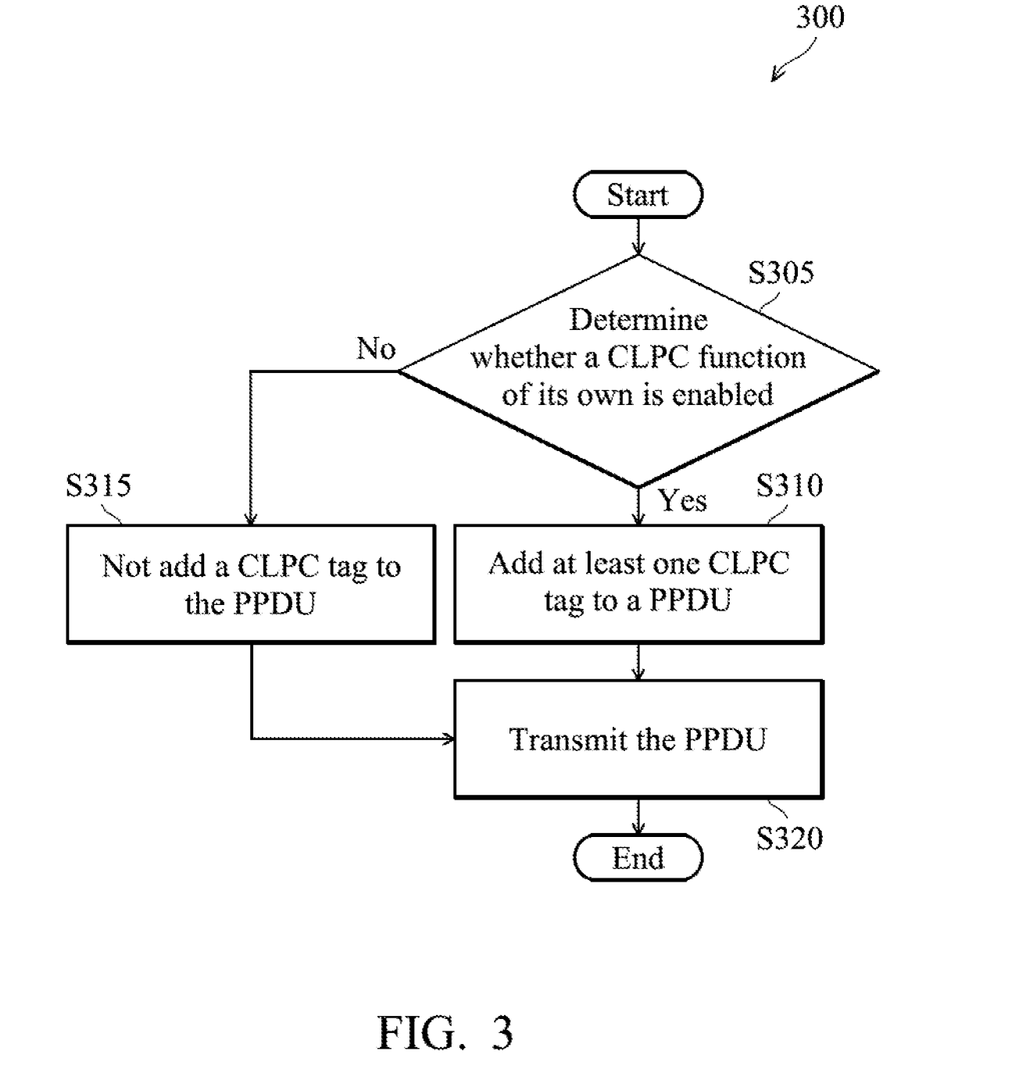
FIG. 3 is a flowchart illustrating a method for avoiding false alarms of CSI due to activation of the CLPC function according to an embodiment of the present disclosure.

FIG. 3 is a flowchart 300 illustrating a method for avoiding false alarms of CSI due to activation of the CLPC function according to an embodiment of the present disclosure. The method may be executed by the transmitting device 210 of the system 200 as shown in FIG. 2.

In step S305, the transmitting device determines whether a CLPC function of its own is enabled. Then, when the CLPC function is enabled ("Yes" in step S305), in step S310, the transmitting device adds at least one CLPC tag to a physical layer convergence procedure (PLCP) protocol data unit (PPDU). When the above CLPC function is not enabled ("No" in step S305), in step S315, the transmitting device does not add a CLPC tag to the PPDU. In step S320, the transmitting device transmits the PPDU.

Figure 4:
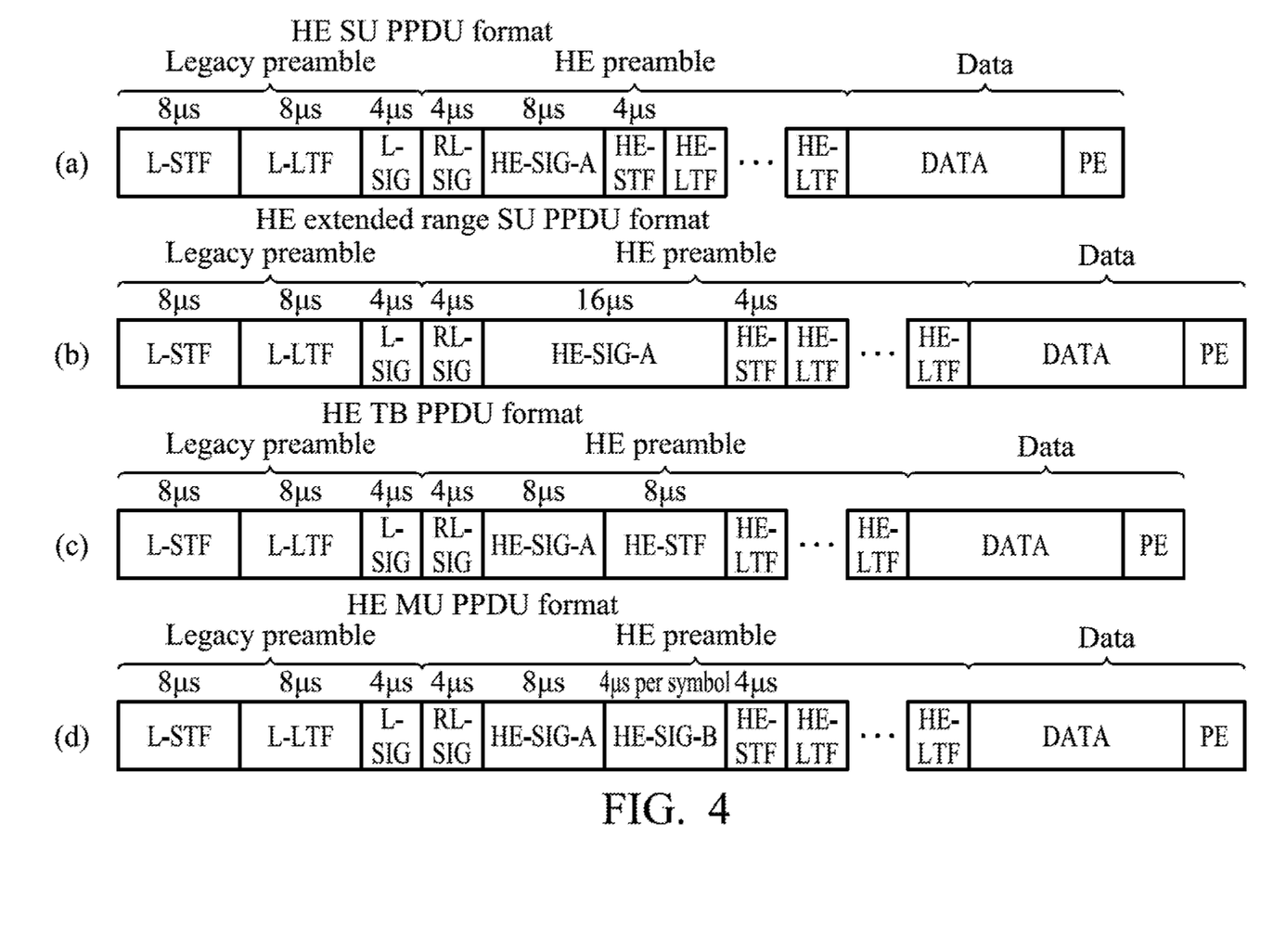
FIG. 4 is a schematic diagram of the PPDU format used in the system 200 according to an embodiment of the present disclosure.

Since the system 200 may support IEEE 802.11n/ac/ax, there are different names corresponding to different standard PPDU formats. For example, in a system that supports IEEE 802.11n, the PPDU format is a high throughput (HT) PPDU format. In a system that supports IEEE 802.11ac, the PPDU format is a very high throughput (VHT) PPDU format. In a system that supports IEEE 802.11ax, the PPDU format is a high-efficiency (HE) PPDU format. The PPDU format in step S315 is shown in FIG. 4. FIG. 4 is a schematic diagram of the PPDU format used in the system 200 according to an embodiment of the present disclosure, wherein the system supports IEEE 802.11ax. It should be noted that although the PPDU format in FIG. 4 used in this example is the HE PPDU format, those skilled in the art may replace or adjust the HE PPDU format to the HT/VHT PPDU format supporting IEEE 802.11n/IEEE 802.11ac according to this embodiment. The sub-figure (a) in FIG. 4 shows a high-efficiency (HE) single user (SU) PPDU format. The HE SU PPDU format is used when the transmitting device transmits PPDUs to a single user.

The sub-figure (b) in FIG. 4 is a high-efficiency (HE) extended range SU PPDU format, wherein the HE extended range SU PPDU format is used when the transmitting device transmits PPDUs to a single user, but the distance from the receiving device is relatively far.

The sub-figure (c) in FIG. 4 is a high-efficiency trigger based (HE TB) PPDU format, wherein the HE TB PPDU format is used for uplink orthogonal frequency division multiple access (OFDMA) and/or multi-user multiple-input multiple-output (MU-MIMO) transmission. The HE TB PPDU carries a single transmission and is transmitted as an immediate response to a trigger frame sent by an access point (AP).

The sub-figure (d) in FIG. 4 is an efficient multiplex user (MU) PPDU format, wherein the HE MU PPDU format is used when the transmitting device transmits PPDUs to one or more users. Except for the HE-SIG-B field, the HE MU PPDU format is similar to the HE SU PPDU format.

Figure 5:
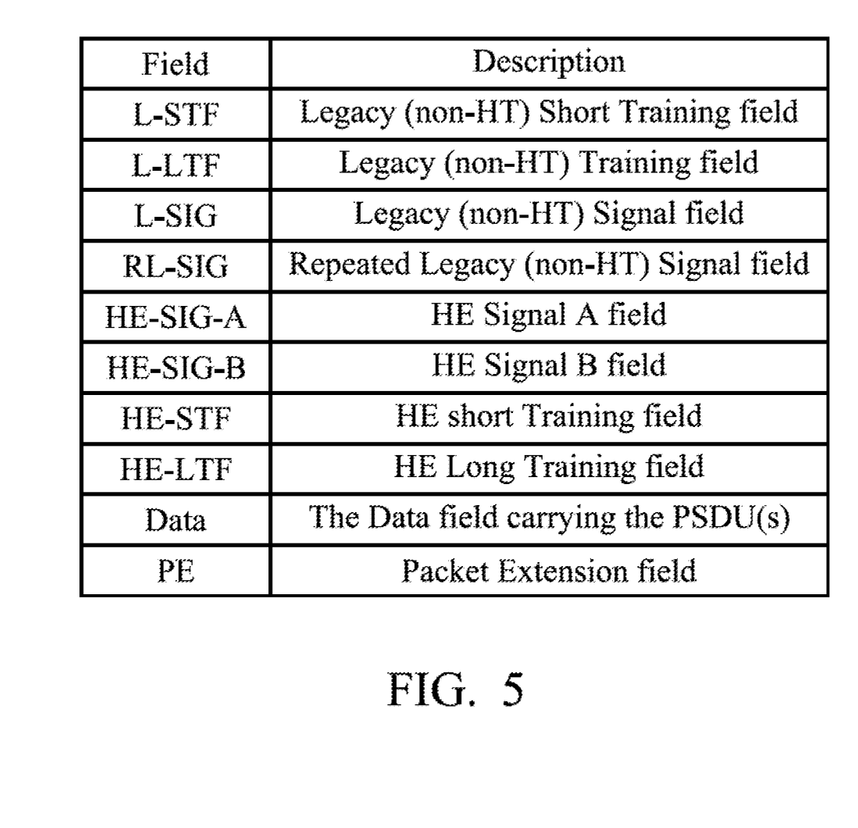
FIG. 5 is a description of the PPDU fields according to an embodiment of the present disclosure.

In this embodiment, the CSI is comprised in the HE long training field (LTF) in the HE preamble. For the description of other fields in FIG. 4, please refer to the description in FIG. 5.

The CLPC tag may be added to at least one of the following fields in the PPDU in FIG. 4: a long training field (LTF) in a high-efficiency (HE) preamble, a service field in the high throughput data field, and a physical service data unit (PSDU) in the high-efficiency data field.

Figure 6:
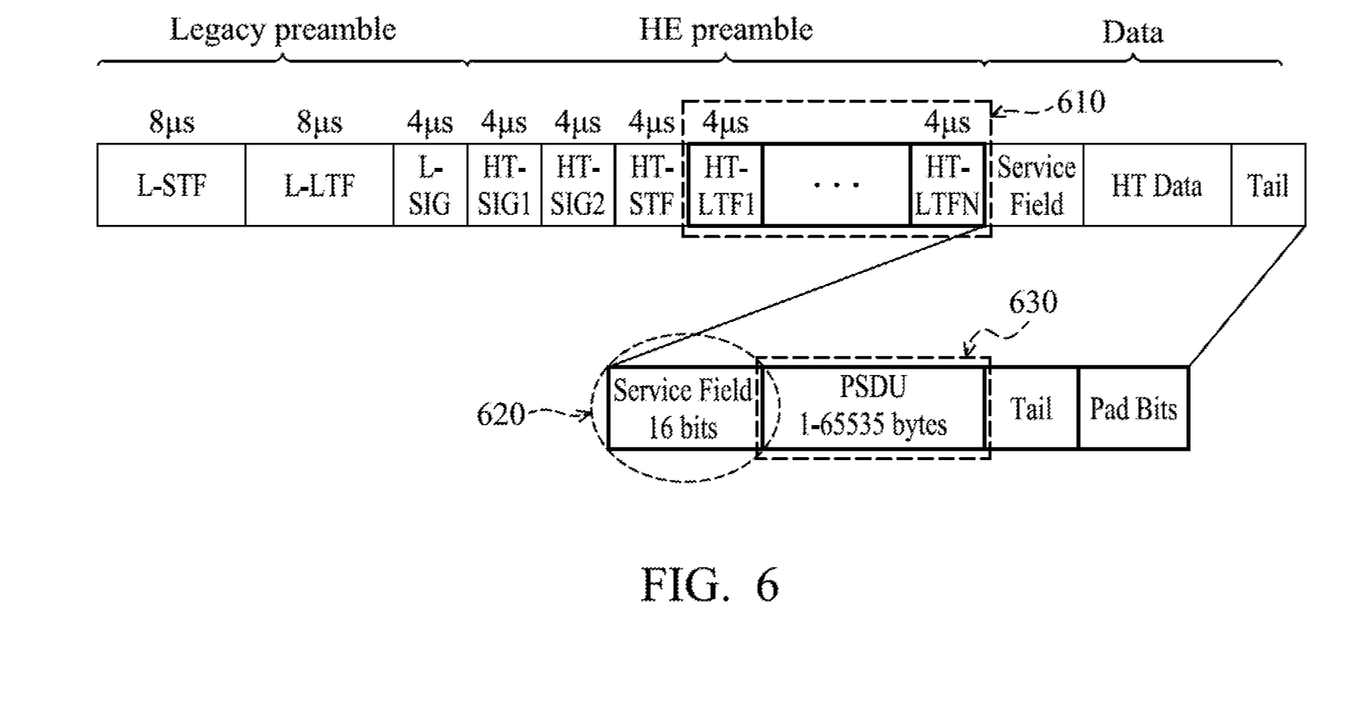
FIG. 6 is a schematic diagram illustrating that the CLPC tag is added to the PPDU according to an embodiment of the present disclosure.

FIG. 6 is a schematic diagram illustrating that the CLPC tag is added to the PPDU according to an embodiment of the present disclosure, wherein the PPDU supports IEEE 802.11n. It should be noted that although the PPDU format in FIG. 6 used in this example is the HT PPDU format, those skilled in the art may replace or adjust the HT PPDU format to the VHT/HE PPDU format supporting IEEE 802.11ac/IEEE 802.11ax according to this embodiment. As shown in FIG. 6, the transmitting device may select a reserved bit for the CLPC tag in the HT-LTF1 to HT-LTFN fields 610 in the HT preamble. The transmitting device may also select a reserved bit in the data service field 620 for the CLPC tag. Alternatively, the transmitting device may also select a reserved bit in the physical service data unit (PSDU) field 630 of the data for the CLPC tag.

Figure 7:
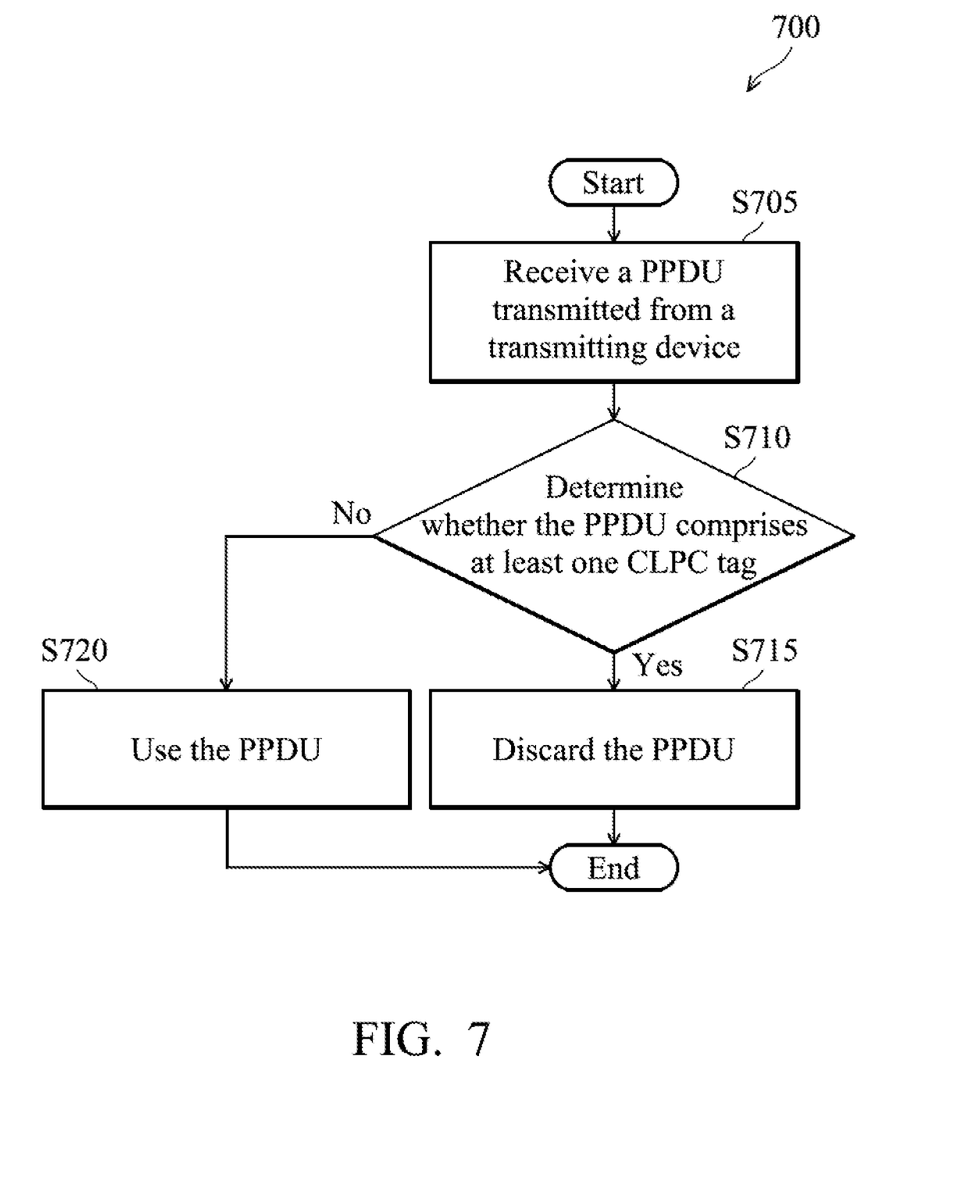
FIG. 7 is a flowchart illustrating a method for avoiding false alarms of CSI due to activation of the CLPC function according to an embodiment of the present disclosure.

FIG. 7 is a flowchart 700 illustrating a method for avoiding false alarms of CSI due to activation of the CLPC function according to an embodiment of the present disclosure. The method may be executed by the receiving device 220 of the system 200 as shown in FIG. 2.

In step S705, the receiving device receives a physical layer convergence procedure (PLCP) protocol data unit (PPDU) transmitted from a transmitting device, wherein the PPDU has one of the following formats: an HT/VHT/HE SU PPDU format, an HE extended range SU PPDU format, an HT/VHT/HE TB PPDU format, and an HT/VHT/HE MU PPDU format.

Next, in step S710, the receiving device determines whether the PPDU comprises at least one CLPC tag, wherein the CLPC tag is located in at least one of the following fields in the PPDU: an LTF in an HT/VHT/HE preamble, a service field in a data field and a PSDU in the data field.

When the PPDU comprises the CLPC tag ("Yes" in step S710), in step S715, the receiving device discards the PPDU. When the PPDU does not comprise the CLPC tag ("No" in step S710), in step S720, the receiving device uses the PPDU as a basis for motion detection.

Therefore, a method and device for avoiding false alarms of CSI due to activation of the CLPC function provided in the disclosed embodiments include the addition of a CLPC tag to the PPDU by the transmitting device, so that the receiving device may directly discard the PPDU carrying the wrong channel state information. This can prevent false alarms.

Figure 8:
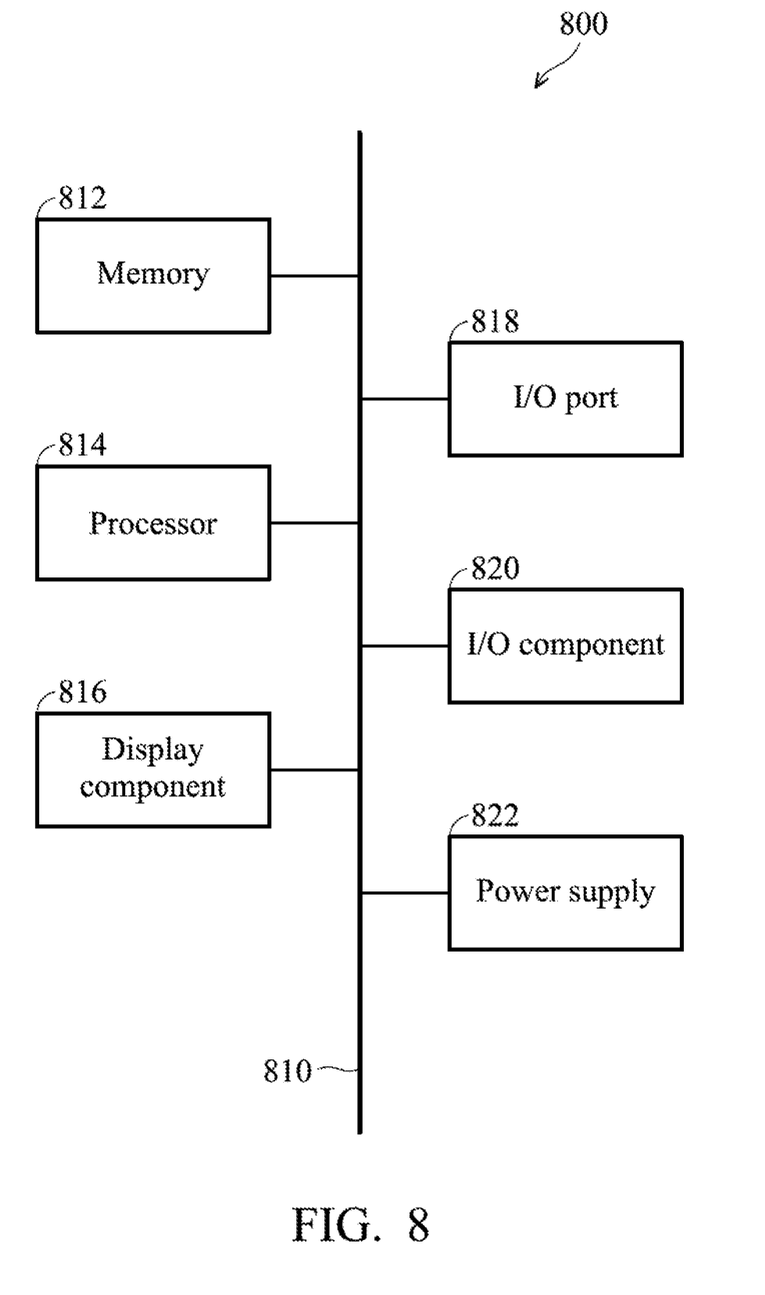
FIG. 8 illustrates an exemplary operating environment for implementing embodiments of the present disclosure.

Having described embodiments of the present disclosure, an exemplary operating environment in which embodiments of the present disclosure may be implemented is described below. Referring to FIG. 8, an exemplary operating environment for implementing embodiments of the present disclosure is shown and generally known as a computing device 800. The computing device 800 is merely an example of a suitable computing environment and is not intended to limit the scope of use or functionality of the disclosure. Neither should the computing device 800 be interpreted as having any dependency or requirement relating to any one or combination of components illustrated.

The disclosure may be realized by means of the computer code or machine-useable instructions, including computer-executable instructions such as program modules, being executed by a computer or other machine, such as a personal data assistant (PDA) or other handheld device. Generally, program modules may include routines, programs, objects, components, data structures, etc., and refer to code that performs particular tasks or implements particular abstract data types. The disclosure may be implemented in a variety of system configurations, including hand-held devices, consumer electronics, general-purpose computers, more specialty computing devices, etc. The disclosure may also be implemented in distributed computing environments where tasks are performed by remote-processing devices that are linked by a communication network.

With reference to FIG. 8, the computing device 800 may include a bus 810 that is directly or indirectly coupled to the following devices: one or more memories 812, one or more processors 814, one or more display components 816, one or more input/output (I/O) ports 818, one or more input/output components 820, and an illustrative power supply 822. The bus 810 may represent one or more kinds of busses (such as an address bus, data bus, or any combination thereof). Although the various blocks of FIG. 8 are shown with lines for the sake of clarity, and in reality, the boundaries of the various components are not specific. For example, the display component such as a display device may be considered an I/O component and the processor may include a memory.

The computing device 800 typically includes a variety of computer-readable media. The computer-readable media can be any available media that can be accessed by computing device 800 and includes both volatile and nonvolatile media, removable and non-removable media. By way of example, not limitation, computer-readable media may comprise computer storage media and communication media. The computer storage media may include volatile and nonvolatile, removable and non-removable media implemented in any method or technology for storage of information such as computer-readable instructions, data structures, program modules or other data. The computer storage media may include, but not limit to, random access memory (RAM), read-only memory (ROM), electrically-erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by the computing device 800. The computer storage media may not comprise signals per se.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, RF, infrared and other wireless media or any combination thereof.

The memory 812 may include computer-storage media in the form of volatile and/or nonvolatile memory. The memory may be removable, non-removable, or a combination thereof. Exemplary hardware devices include solid-state memory, hard drives, optical-disc drives, etc. The computing device 800 includes one or more processors that read data from various entities such as the memory 812 or the I/O components 820. The display component(s) 816 present data indications to a user or to another device. Exemplary presentation components include a display device, speaker, printing component, vibrating component, etc.

The I/O ports 818 allow the computing device 800 to be logically coupled to other devices including the I/O components 820, some of which may be embedded. Illustrative components include a microphone, joystick, game pad, satellite dish, scanner, printer, wireless device, etc. The I/O components 820 may provide a natural user interface (NUI) that processes gestures, voice, or other physiological inputs generated by a user. For example, inputs may be transmitted to an appropriate network element for further processing. A NUI may be implemented to realize speech recognition, touch and stylus recognition, facial recognition, biometric recognition, gesture recognition both on screen and adjacent to the screen, air gestures, head and eye tracking, touch recognition associated with displays on the computing device 800, or any combination thereof. The computing device 800 may be equipped with depth cameras, such as stereoscopic camera systems, infrared camera systems, RGB camera systems, or any combination thereof, to realize gesture detection and recognition. Furthermore, the computing device 800 may be equipped with accelerometers or gyroscopes that enable detection of motion. The output of the accelerometers or gyroscopes may be provided to the display of the computing device 800 to carry out immersive augmented reality or virtual reality.

Furthermore, the processor 814 in the computing device 800 can execute the program code in the memory 812 to perform the above-described actions and steps or other descriptions herein.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for avoiding false alarms of Channel State Information (CSI) due to activation of Closed Loop Power Control (CLPC) function, wherein the method is performed by a transmitting device and comprises:
   determining whether the CLPC function of the transmitting device is enabled;
   adding at least one CLPC tag to a physical layer convergence procedure (PLCP) protocol data unit (PPDU) when the CLPC function is enabled; and
   transmitting the PPDU to a receiving device to prevent the receiving device from causing false alarms of CSI due to activation of the CLPC function.

2. The method for avoiding false alarms of Channel State Information (CSI) due to the activation of a Closed Loop Power Control (CLPC) function as claimed in claim 1, wherein the CLPC tag is added to at least one of the following fields in the PPDU:
   a long training field (LTF) in a high throughput (HT)/very high throughput (VHT)/high-efficiency (HE) preamble;
   a service field in a data field; and
   a physical service data unit (PSDU) in the data field.

3. The method for avoiding false alarms of Channel State Information (CSI) due to the activation of a Closed Loop Power Control (CLPC) function as claimed in claim 1, wherein the PPDU has one of the following formats:
   an HT/VHT/HE single user (SU) PPDU format;
   an HT/VHT/HE extended range SU PPDU format;
   an HT/VHT/HE trigger based (TB) PPDU format; and
   an HT/VHT/HE multiplex user (MU) PPDU format.

4. The method for avoiding false alarms of Channel State Information (CSI) due to the activation of a Closed Loop Power Control (CLPC) function as claimed in claim 1, wherein the transmitting device supports IEEE 802.11n/ac/ax.

5. The method for avoiding false alarms of Channel State Information (CSI) due to the activation of a Closed Loop Power Control (CLPC) function as claimed in claim 1, wherein the method further comprises:
   not adding the CLPC tag to the PPDU when the CLPC function is not enabled.

6. A device for avoiding false alarms of Channel State Information (CSI) due to the activation of a Closed Loop Power Control (CLPC) function comprises:
   one or more processors; and
   one or more computer storage media for storing one or more computer-readable instructions, wherein the processor is configured to drive the computer storage media to execute the following tasks:
   determining whether the CLPC function of the device is enabled;
   adding at least one CLPC tag to a physical layer convergence procedure (PLCP) protocol data unit (PPDU) when the CLPC function is enabled; and
   transmitting the PPDU to a receiving device to prevent the receiving device from causing false alarms of CSI due to activation of the CLPC function.

7. The device for avoiding false alarms of Channel State Information (CSI) due to the activation of a Closed Loop Power Control (CLPC) function as claimed in claim 6, wherein the CLPC tag is added to at least one of the following fields in the PPDU:
   a long training field (LTF) in a high throughput (HT)/very high throughput (VHT)/high-efficiency (HE) preamble;
   a service field in a data field; and
   a physical service data unit (PSDU) in the data field.

8. The device for avoiding false alarms of Channel State Information (CSI) due to the activation of a Closed Loop Power Control (CLPC) function as claimed in claim 6, wherein the PPDU has one of the following formats:
   an HT/VHT/HE single user (SU) PPDU format;
   an HT/VHT/HE extended range SU PPDU format;
   an HT/VHT/HE trigger based (TB) PPDU format; and
   an HT/VHT/HE multiplex user (MU) PPDU format.

9. The device for avoiding false alarms of Channel State Information (CSI) due to the activation of a Closed Loop Power Control (CLPC) function as claimed in claim 6, wherein the device supports IEEE 802.11n/ac/ax.

10. The device for avoiding false alarms of Channel State Information (CSI) due to the activation of a Closed Loop Power Control (CLPC) function as claimed in claim 6, wherein the processor further executes:
   not adding the CLPC tag to the PPDU when the CLPC function is not enabled.

* * * * *